United States Patent
Mori

(10) Patent No.: US 8,305,614 B2
(45) Date of Patent: Nov. 6, 2012

(54) INFORMATION PROCESSING SYSTEM AND METHOD OF CONTROLLING SAME

(75) Inventor: Ryuta Mori, Kawasaki (JP)

(73) Assignee: Canon Kabushiki Kaisha (JP)

( * ) Notice: Subject to any disclaimer, the term of this patent is extended or adjusted under 35 U.S.C. 154(b) by 593 days.

(21) Appl. No.: 12/333,727

(22) Filed: Dec. 12, 2008

(65) Prior Publication Data
US 2009/0153918 A1 Jun. 18, 2009

(30) Foreign Application Priority Data

Dec. 14, 2007 (JP) ................................ 2007-324014
Dec. 9, 2008 (JP) ................................ 2008-313709

(51) Int. Cl.
*H04N 1/04* (2006.01)
(52) U.S. Cl. .......... 358/1.15; 358/474; 399/82; 382/209
(58) Field of Classification Search ................ 358/1.15, 358/474, 444, 426.06; 382/209; 399/82
See application file for complete search history.

(56) References Cited

U.S. PATENT DOCUMENTS

| 6,466,336 | B1 * | 10/2002 | Sturgeon et al. | 358/444 |
| 6,898,317 | B2 * | 5/2005 | Struble et al. | 382/209 |
| 7,019,858 | B1 * | 3/2006 | Gopalasamy | 358/1.15 |
| 7,466,456 | B2 * | 12/2008 | Kanno | 358/426.06 |
| 2004/0062562 | A1 * | 4/2004 | Nakatani et al. | 399/82 |

FOREIGN PATENT DOCUMENTS

JP 2006-189930 A 7/2006

* cited by examiner

*Primary Examiner* — Charlotte M Baker
*Assistant Examiner* — Ashish K Thomas
(74) *Attorney, Agent, or Firm* — Rossi, Kimms & McDowell LLP

(57) ABSTRACT

A scan job for scanning in an evidenced document is transmitted from a client terminal to a scanner. The scanner executes the scan job that has been received. If the scan job to be executed designates overlay printing, form data to be overlaid with the data scanned in by the scan job is selected (S205) and the selected form and scanned-in data are overlaid (S205). As a result, user operation is simplified while wasting of paper is eliminated.

11 Claims, 17 Drawing Sheets

FIG. 8

| JOB ID | USER ID | REGISTRA-TION TIME | PRE-REGISTRA-TION TYPE | EVIDENCED DOCUMENT TYPE | NUMBER OF SCANNED SHEETS | PREVIEW | DOUBLE-SIDED SETTING | CHANGE RESOLU-TION | RESOLU-TION DESIGNA-TION | STORAGE SERVER |
|---|---|---|---|---|---|---|---|---|---|---|
| 1112101 | 342343 | 2007/5/8 | EVIDENCED DOCUMENT SCAN | DEBIT NOTE | 2 | yes | no | yes | default | EVIDENCED DOCUMENT SERVER |
| 1112102 | 443424 | 5007/5/9 | | DELIVERY SLIP | 1 | yes | no | yes | default | |
| 1112103 | 222343 | 2007/5/10 | | ESTIMATE | 1 | yes | no | yes | default | |

FIG. 9

| JOB ID | PAGE NO. | COMPANY NAME | ACCOUNT ITEM | ITEM NAME | AMOUNT | TRANSACTION NAME | REMARKS |
|---|---|---|---|---|---|---|---|
| 1112101 | 1 | ABC | 4343 | YYY | 103200 | COST OF SOFT A | 4 |
| | 2 | C | 4343 | YYZ | 10500 | COST OF SOFT B | 5 |
| | 3 | DDA | 4343 | ZZY | 26450 | COST OF SOFT C | 6 |

FIG. 10

| menu | parameter 1 | | | | parameter 2 | | | |
|---|---|---|---|---|---|---|---|---|
| | name | default | min | max | name | default | min | max |
| EVIDENCED DOCUMENT SCAN | RESOLUTION | 600 | 200 | 2400 | FORM SETTING | A4 | B5 | A3 |
| SCAN | — | — | — | — | — | — | — | — |
| SEND SCAN | — | — | — | — | — | — | — | — |

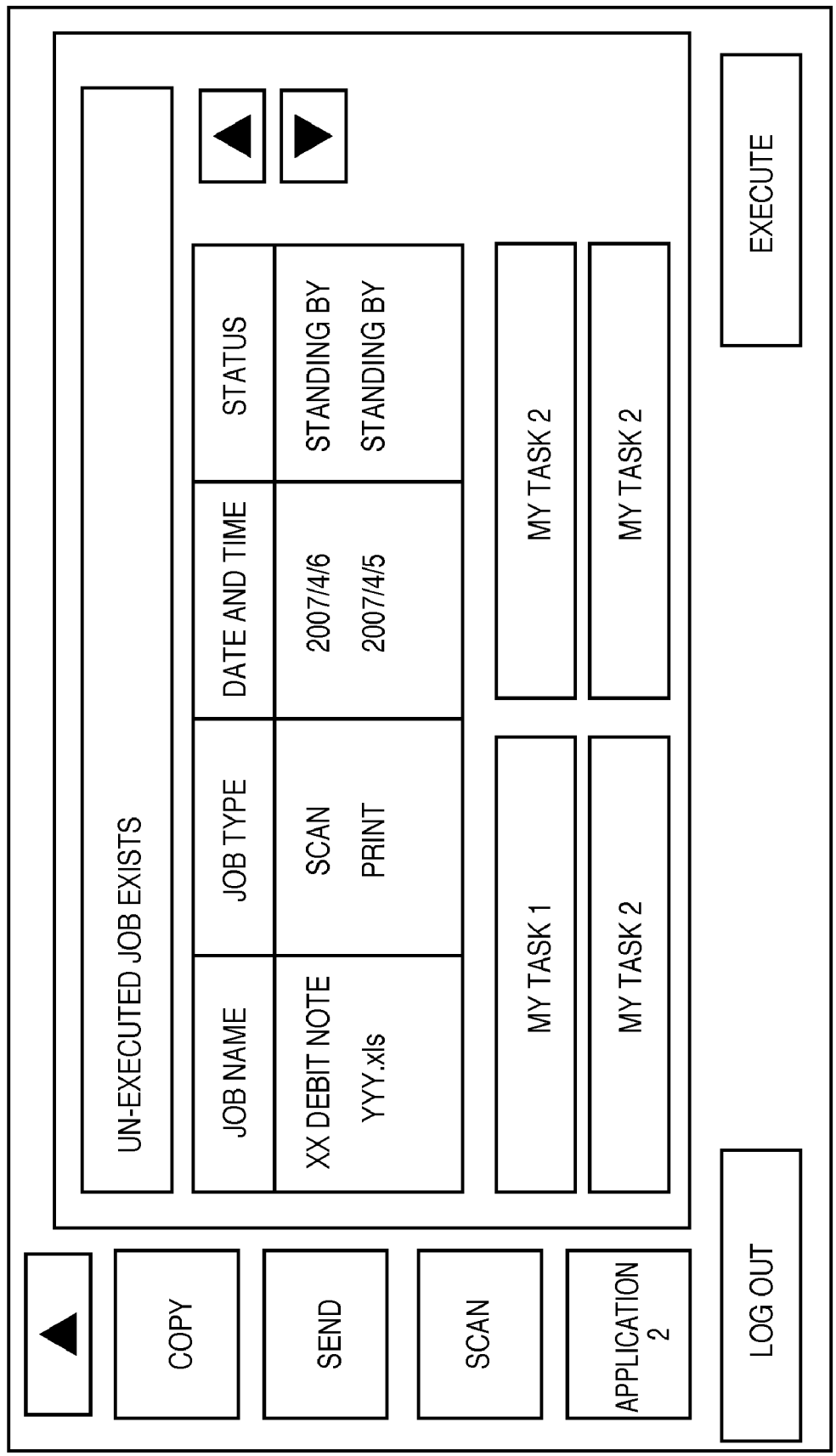

INFORMATION PROCESSING SYSTEM AND METHOD OF CONTROLLING SAME

BACKGROUND OF THE INVENTION

1. Field of the Invention

The present invention relates to an information processing system that includes a client terminal, a server and an image forming apparatus connected to a network, and to a method of controlling this system.

2. Description of the Related Art

The electronic ledger sheet preservation law has been revised and it is now possible to read in an evidenced document (e.g., a written estimate, a delivery slip or a billing statement), etc., by a scanner or the like and store the document as electronic data. In order to store such evidenced document data as electronic data, the steps described below are performed according to the prior art (see Japanese Patent Laid-Open No. 2006-189930).

First, a form for affixing the evidenced document is printed. An identifier such as a bar code is printed on the form so that the evidenced document to be affixed to the form can be managed uniquely. The evidenced document is then affixed to the form and is read by a multifunction peripheral. At this time the user sets the server at the destination that is to register the evidenced document data that has been read and sets the scanning resolution. When scanning is completed, the evidenced document data that has been read is stored in an evidenced document server.

The conventional technique described above, however, leads to waste of papers for printing forms. Furthermore, according to the conventional technique the multifunction peripheral must be occupied for an extended period of time in order to perform various settings at the time of scanning. In addition, since there is no check, etc., of original documents when the documents are scanned, a problem which arises is that data having legal defects may happen to be registered.

SUMMARY OF THE INVENTION

The present invention overlays and outputs data that has been scanned in accordance with a registered scan job and a form upon judging the consistency.

One aspect of the present invention provides an information processing system including a client terminal, a server and a scanner connected to a network, the system having a sending unit that sends a scan job from the client terminal to the scanner, and the scanner includes a receiving unit that receives the scan job, an operation unit that accepts a designation to execute the scan job received by the receiving unit, a scanning unit that scans in an evidenced document in accordance with the scan job and generates evidenced document data in a case where a designation to execute the scan job has been accepted, a selecting unit which, in a case where the received scan job includes an overlay designation to overlay the evidenced document data and form data, selects a form for being overlaid with the evidenced document data and an overlay unit that overlays the data of the form selected by the selecting unit and the evidenced document data.

Another aspect of the present invention provides a method of controlling an information processing system including a client terminal, a server and a scanner connected to a network, the method comprising a step of receiving a scan job, a scanning step of scanning in an evidenced document and generating evidenced document data in accordance with the received scan job, a selecting step of selecting a form for being overlaid with evidenced document data in a case where the received scan job includes an overlay designation to overlay the evidenced document data and form data and an overlay step of overlaying the data of the form selected at the selecting step and the evidenced document data.

Further features of the present invention will become apparent from the following description of exemplary embodiments with reference to the attached drawings.

BRIEF DESCRIPTION OF THE DRAWINGS

FIG. 8 is a diagram useful in describing an example of a scan job table in which scan jobs are registered;

FIG. 9 is a diagram illustrating an example of an individual-job table according to an embodiment of the present invention;

FIG. 10 is a diagram illustrating an example of a parameter settings table set on a per-menu-item basis according to an embodiment of the present invention;

FIG. 14 is a diagram illustrating an example of a display presented on the display unit of a control panel of an image forming apparatus according to an embodiment of the present invention.

DESCRIPTION OF THE EMBODIMENTS

A preferred embodiment of the present invention will now be described in detail with reference to the drawings. It should be noted that the relative arrangement of the components, the numerical expression and numerical value set forth in these embodiment do not limit the scope of the present invention unless it is specifically stated otherwise.

In the specification, the term "evidenced document" means a document serving as evidence that certifies the fact of a transaction. Examples are an invoice, a debit note and a receipt from a vendor, and an order sheet from a customer, etc.

Figure 1:
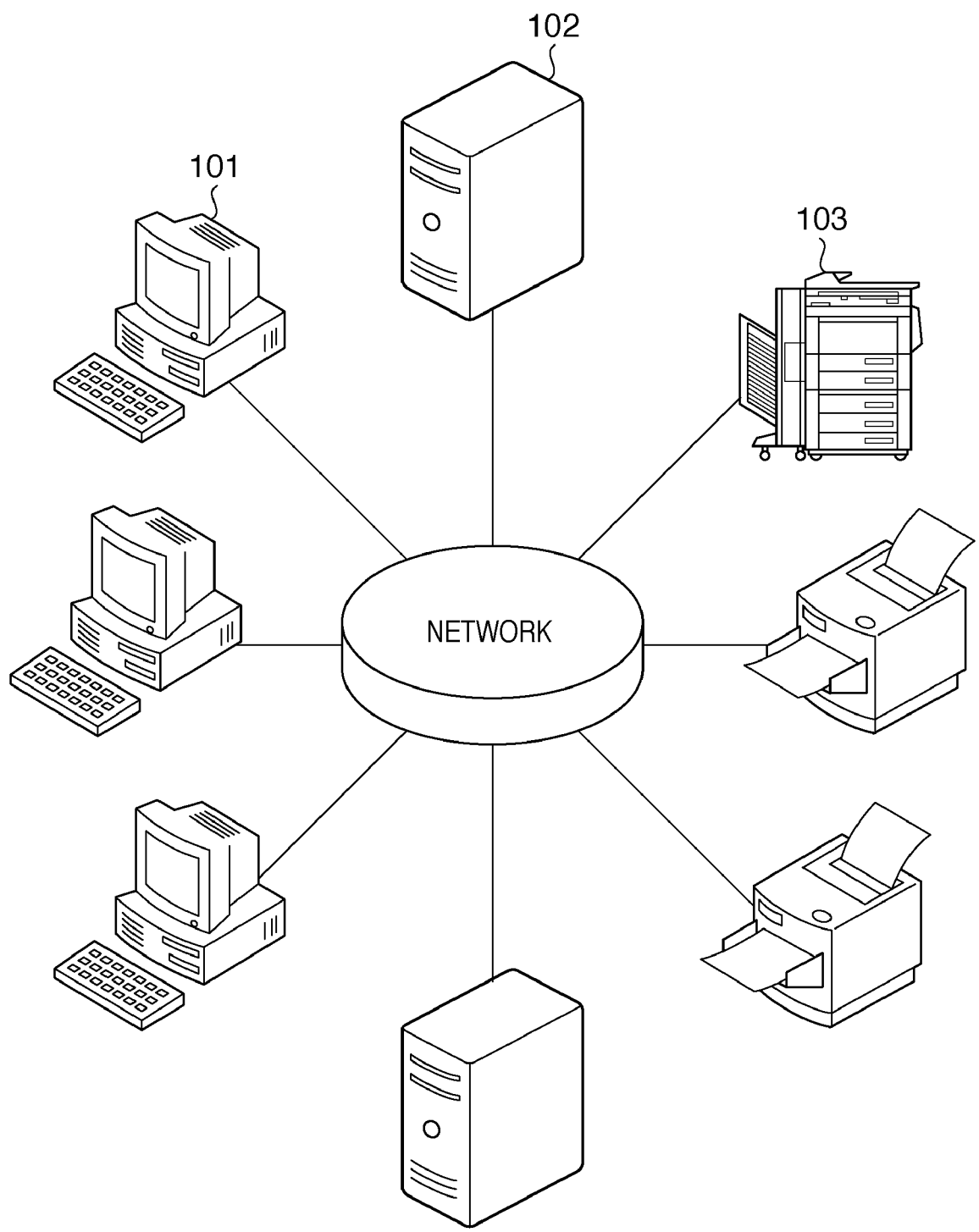
FIG. 1 is a diagram illustrating the configuration of an information processing system according to an embodiment of the present invention.

FIG. 1 is a diagram illustrating the configuration of an image processing system according to an embodiment of the present invention.

A system is constructed by connecting a plurality of devices to a network, which may be one such as the Internet or an intranet. A client computer (client terminal) 101, an evidenced document server 102 and an image forming apparatus 103 are connected to the network. A multifunction peripheral inclusive of a scanner and printer, etc., is considered as one example of an image forming apparatus in this embodiment. Programs according to this embodiment are stored in storage devices within the client computer 101 and image forming apparatus 103. When each device is started up, a program is loaded in the respective cache memory and becomes executable. Further, form data for overlaying evidenced documents is stored in the evidenced document server 102. The form data may also be stored in the storage device within the image forming apparatus 103. The image forming apparatus 103 may be a multifunction peripheral having a scanning function. Here the term "overlay" means to superimpose a plurality of images or bitmap objects and generate a single bitmap image.

Figure 11:
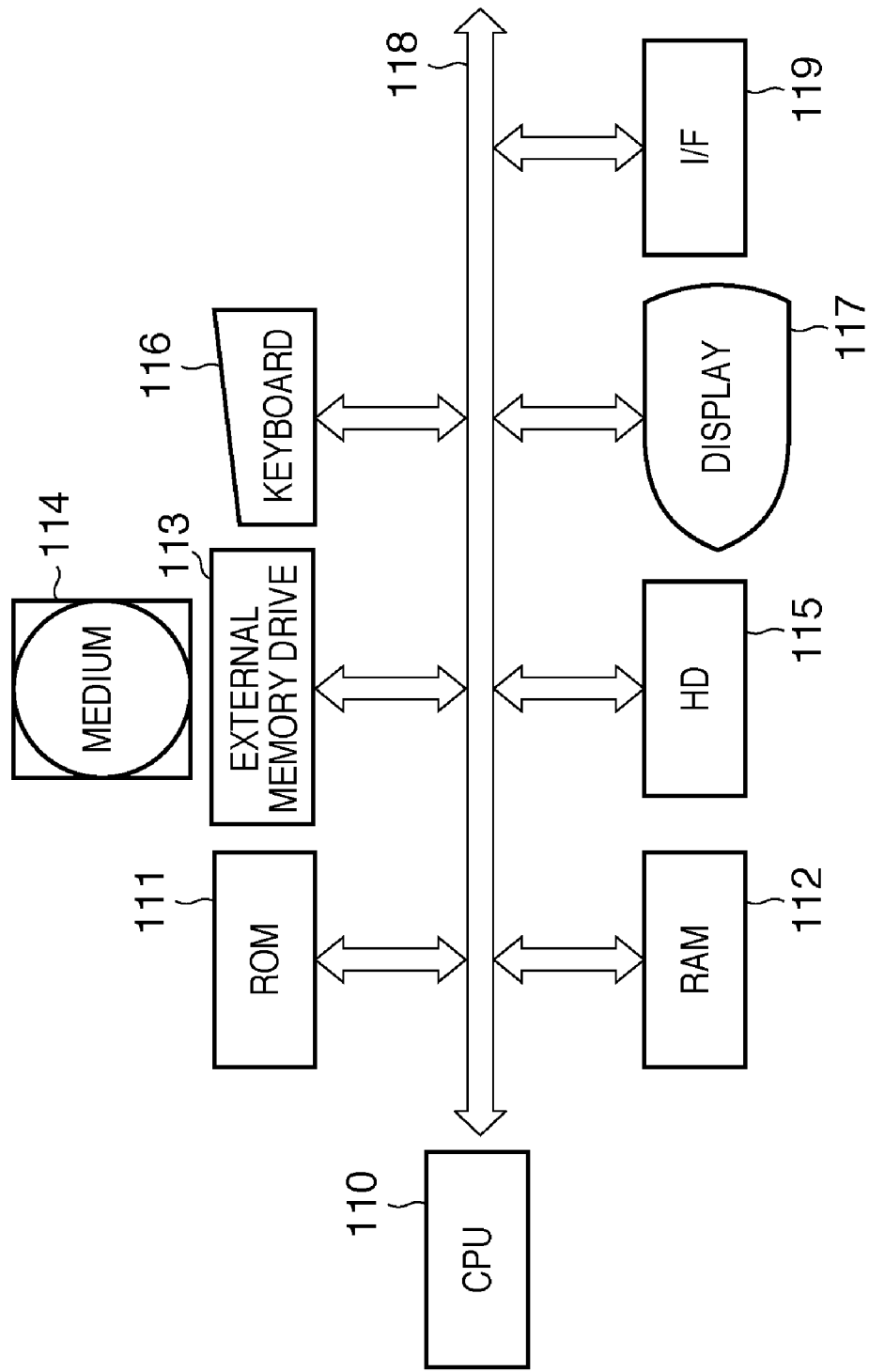
FIG. 11 is a block diagram illustrating the configuration of a client computer that runs programs according to an embodiment of the present invention.

FIG. 11 is a block diagram illustrating the configuration of the client computer 101 that runs programs according to this embodiment.

An application program, a printer driver program, an operating system and a network printer control program, which have been stored on a hard disk (HD) 115, are loaded in a RAM and executed by a CPU 110. The RAM 112 temporarily stores information and files, etc., necessary for execution of the programs. A ROM 111 stores programs such as a basic I/O program and various data such as font data and template data used when performing word processing. The RAM 112 functions also as a main memory and work area of the CPU 110. An external memory drive 113 is capable of loading a program, etc., which has been stored on a medium 114, in the computer 101. The medium 114 stores programs according to this embodiment as well as related data. A keyboard 116 allows the user to input commands such as a device control command to the client computer 101. A display 117 displays commands that have been input by the user as well as the status of the image forming apparatus 103, etc. A system bus 118 controls the flow of data within the client computer 101. A network interface (I/F) 119 is a communication interface for connecting to a local-area network or to the Internet.

Figure 12:
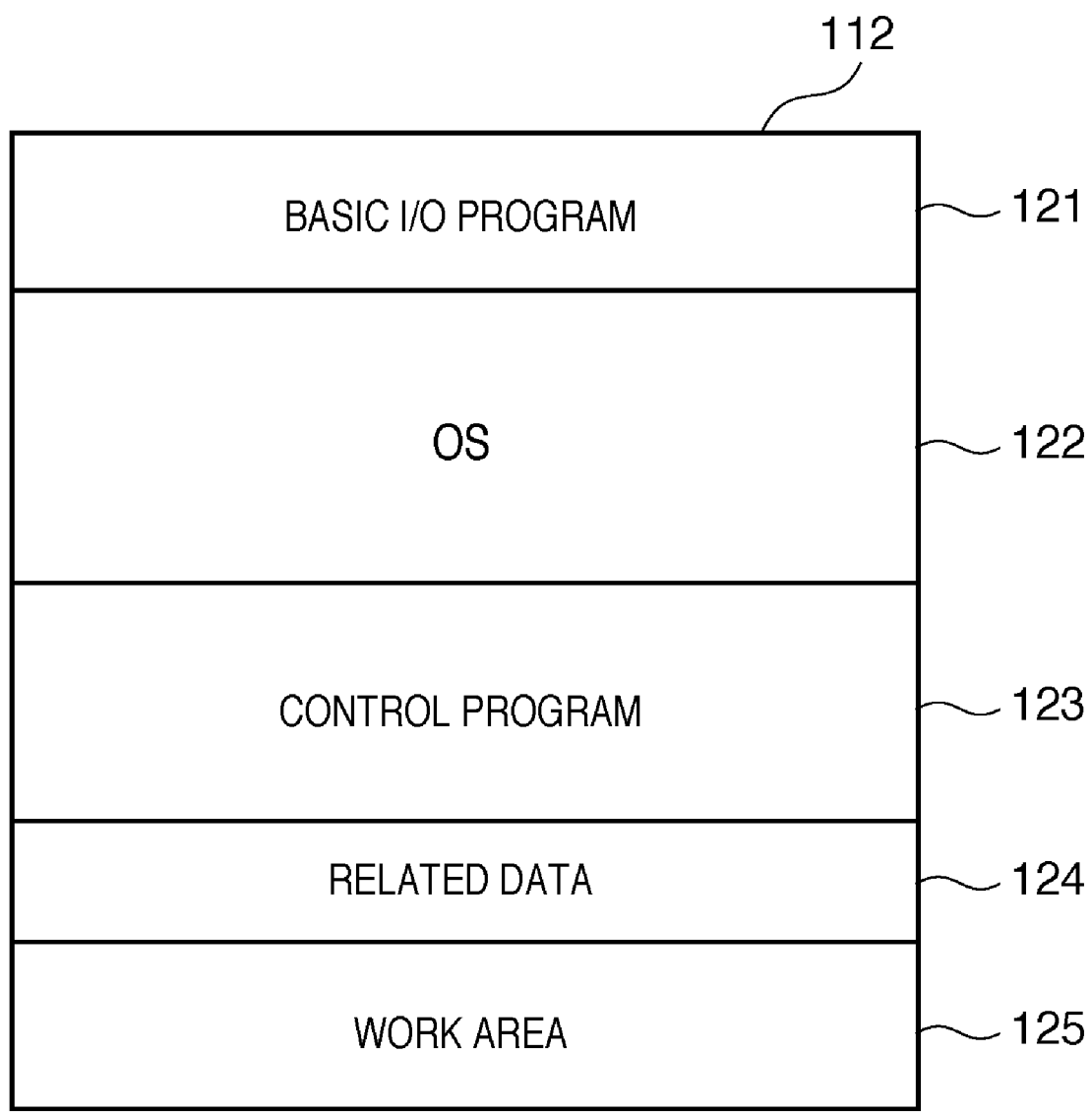
FIG. 12 is a diagram illustrating a memory map in which programs according to an embodiment of the present invention have been loaded in a RAM and are capable of being executed by a CPU.

FIG. 12 is a diagram illustrating a memory map in which programs according to an embodiment of the present invention have been loaded in RAM 12 and are capable of being executed by CPU 110.

In this embodiment, an example in which programs and related data are executed upon being loaded directly from the medium 114 to the RAM 112 is illustrated. However, the present invention is not limited to such an arrangement. For example, it may be so arranged that the programs and related data are loaded from the hard disk 115 to the RAM 112. Further, the medium 114 may be a flexible disk, CD-ROM, DVD or IC memory card, etc. It may be so arranged that programs are recorded in the ROM 111 and become a portion of the memory map, and the programs may be executed by the CPU 110 directly.

A basic I/O program 121 is read from the hard disk 115 to the RAM 112 by an operating system 122 when the power supply of client computer 101 is turned on. The basic I/O program 121 has an IPL (Initial Program Loading) function for starting operation of the operating system 122. Reference numerals 123 and 124 denote areas in which a control program and related data, respectively, are expanded. A work area 125 is used when this program is executed.

Figure 13:
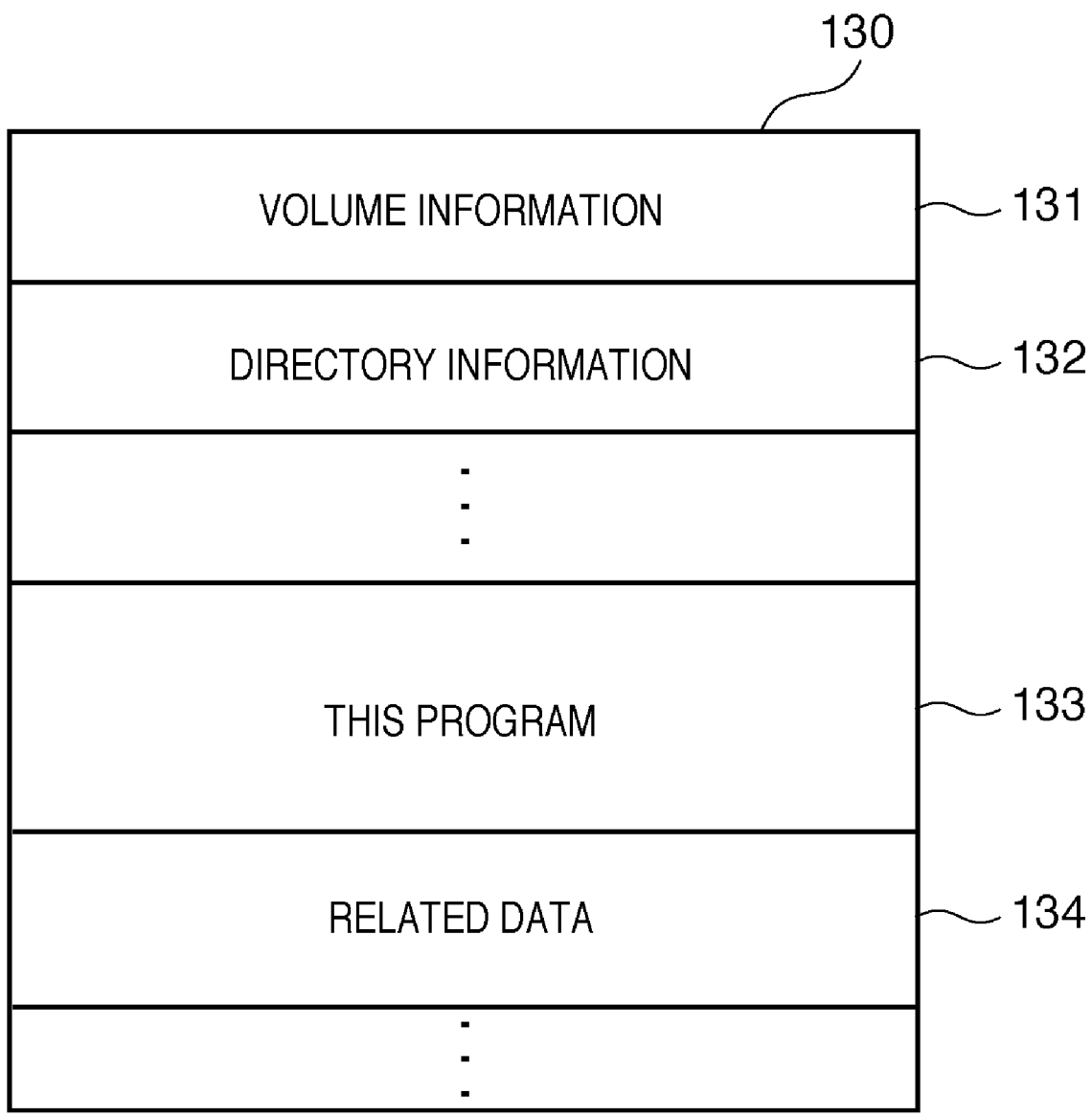
FIG. 13 is a diagram useful in describing the data structure of a medium.

FIG. 13 is a diagram useful in describing the data structure of the medium 114.

Reference numerals 130, 131 and 132 represent the data contained in the medium 114, volume information indicating information concerning the data, and director information, respectively. Reference numerals 133 and 134 denote the program described in this embodiment and the related data, respectively. The functions of the program 133 will be described in detail below with reference to FIG. 2 to FIGS. 6A, 6B.

Figure 2:
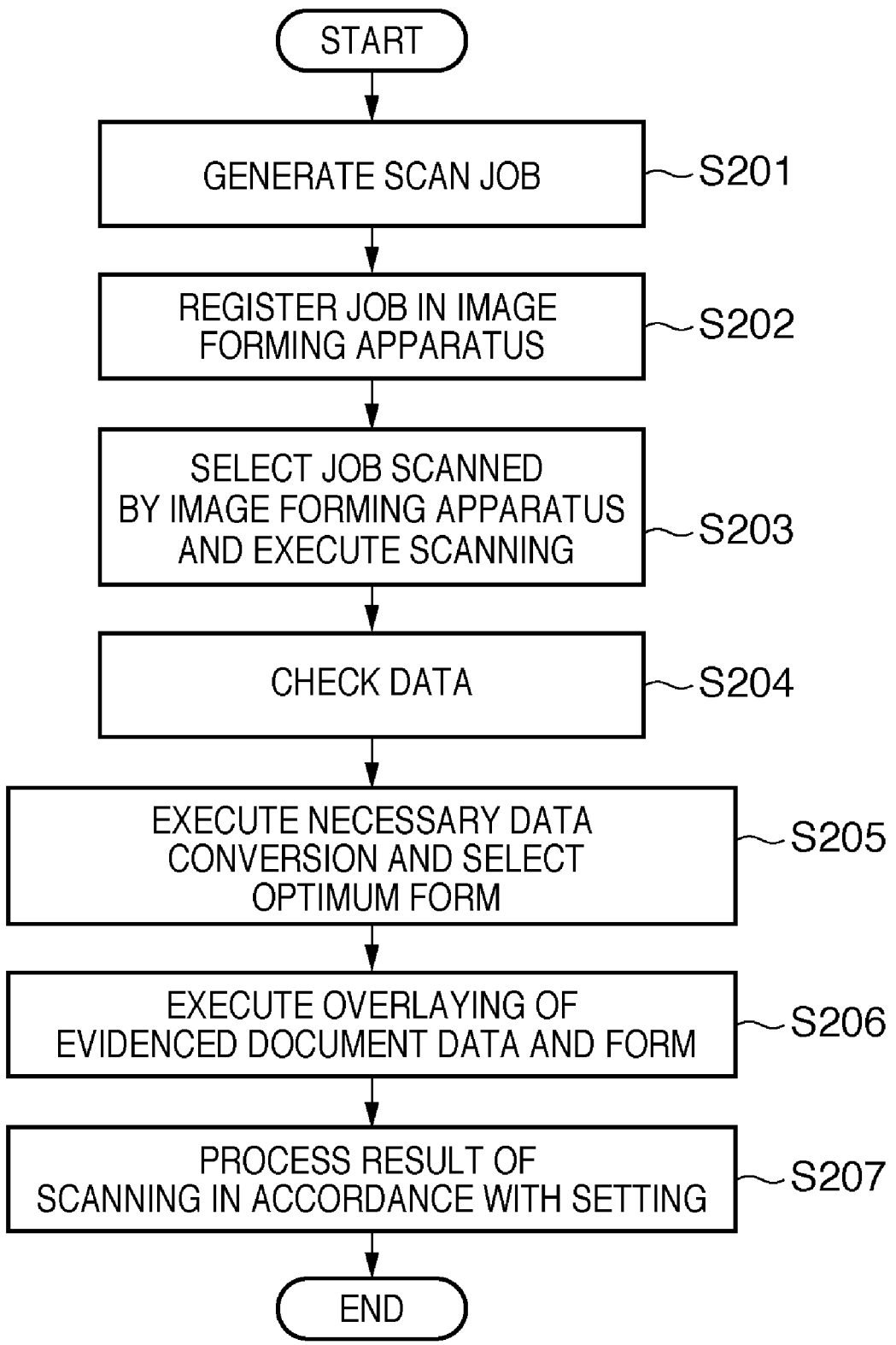
FIG. 2 is a flowchart useful in describing the flow of processing by a client computer and image forming apparatus according to an embodiment of the present invention.

FIG. 2 is a flowchart useful in describing the flow of processing by the client computer and image forming apparatus according to this embodiment. This processing is executed by the program based upon user operation.

First, the client computer 101 generates a scan job at step S201 in accordance with an operation performed by the user. Next, the client computer 101 transmits the generated scan job to and registers it in the image forming apparatus 103 at step S202. The image forming apparatus 103 is capable of scanning in an image from a document and of capturing the image as electronic data. The processing at step S202 is executed automatically at the moment the processing of step S201 is completed. The image forming apparatus 103 accepts log-in processing from the user at any timing. When log-in is accepted and authentication of the user succeeds, the image forming apparatus 103 causes the scan job registered by the user to be displayed on the control panel of the apparatus.

Next, at step S203, the image forming apparatus 103 selects and specifies a scan job, which is desired to be executed, from the displayed list in accordance with user operation. When an evidenced document is placed on a glass platen and an execute button (see FIG. 14) is pressed, the image forming apparatus 103 at step S204 compares and checks set values of previously registered scan jobs and evidenced document data obtained by scanning in the evidenced document. For example, the evidenced document data scanned in based upon the scan job and evidenced document type registered for this scan job are compared and whether they match or not is determined. Next, at step S205, the image forming apparatus 103 executes the necessary data conversion processing (e.g., a resolution conversion) in accordance with the result of the check at step S204 and selects the optimum form. Next, at step S206, the image forming apparatus 103 overlays the evidenced document image on the form image following the conclusion of the conversion processing at step S205. Control then proceeds to step S207, where the result of execution of overlay processing is stored in the evidenced document server 102 designated.

Figure 3:
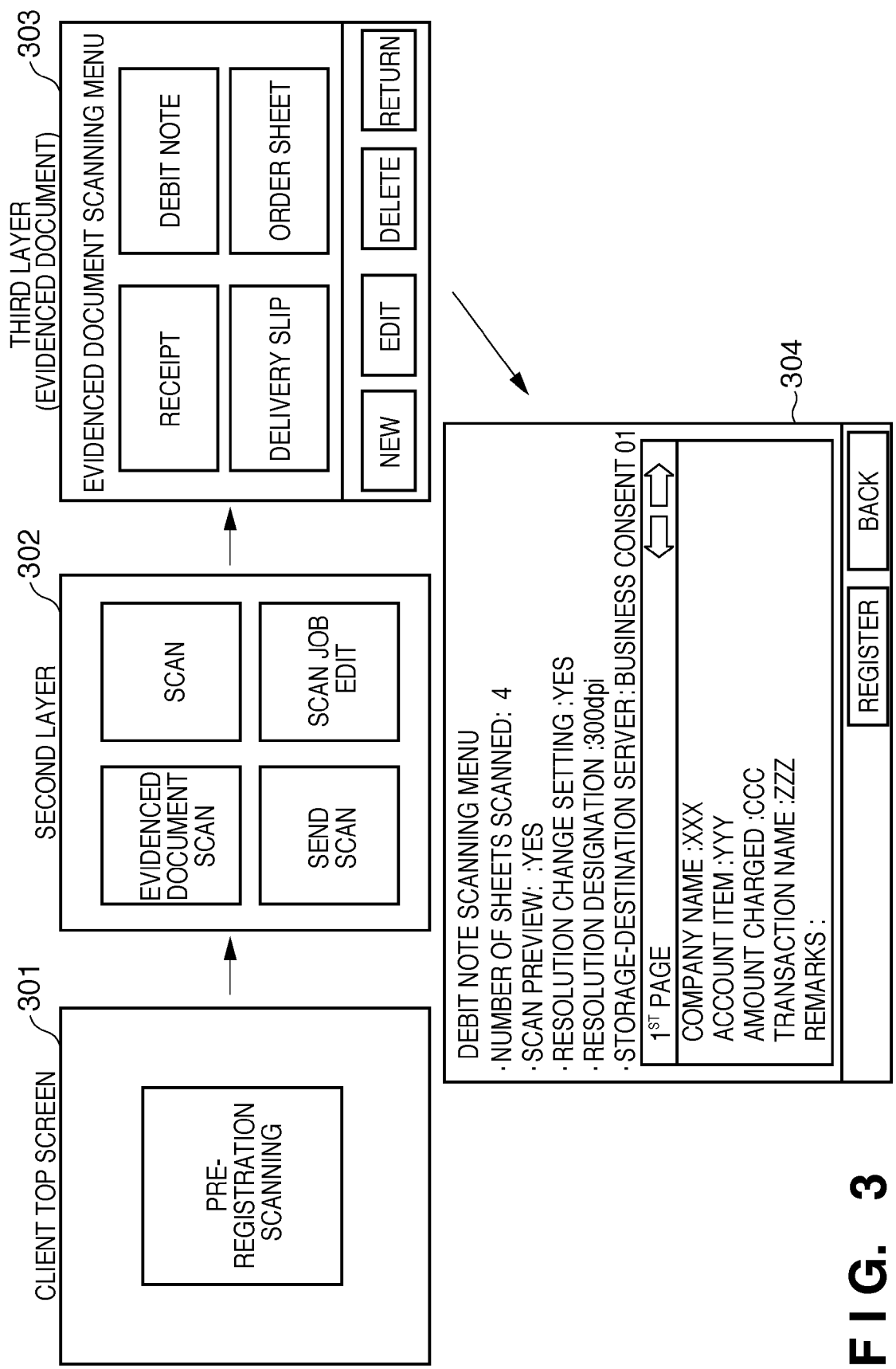
FIG. 3 is a diagram useful in describing an example of a user interface for generating a scan job according to an embodiment of the present invention.

FIG. 3 is a diagram useful in describing an example of a user interface for generating a scan job.

First, when the client computer 101 accesses the image forming apparatus 103, the later displays a TOP screen 301 at the client computer in response to being accessed. Upon sensing the fact that the user has clicked pre-registration scanning, the image forming apparatus 103 displays a menu 302 for pre-registration scanning. If "EVIDENCED DOCUMENT SCAN" (reading of an evidenced document) is selected, then an evidenced document scan menu 303 is displayed. If an edit button is clicked on the evidenced document scan menu 303, then a menu screen 304 is displayed in order to accept editing of parameters in the menu. Detailed settings of this evidenced document scan (debit note scanning menu) are displayed on the menu screen 304. These detailed settings include number of scanned sheets, scan preview, resolution change enable/disable, resolution designation and designation of evidenced document server that is the destination of storage. Further, company name, account item, amount charged and remarks can be added for every page scanned. As a result, items are registered on a per-page basis, as illustrated in FIG. 9.

Figure 4A:
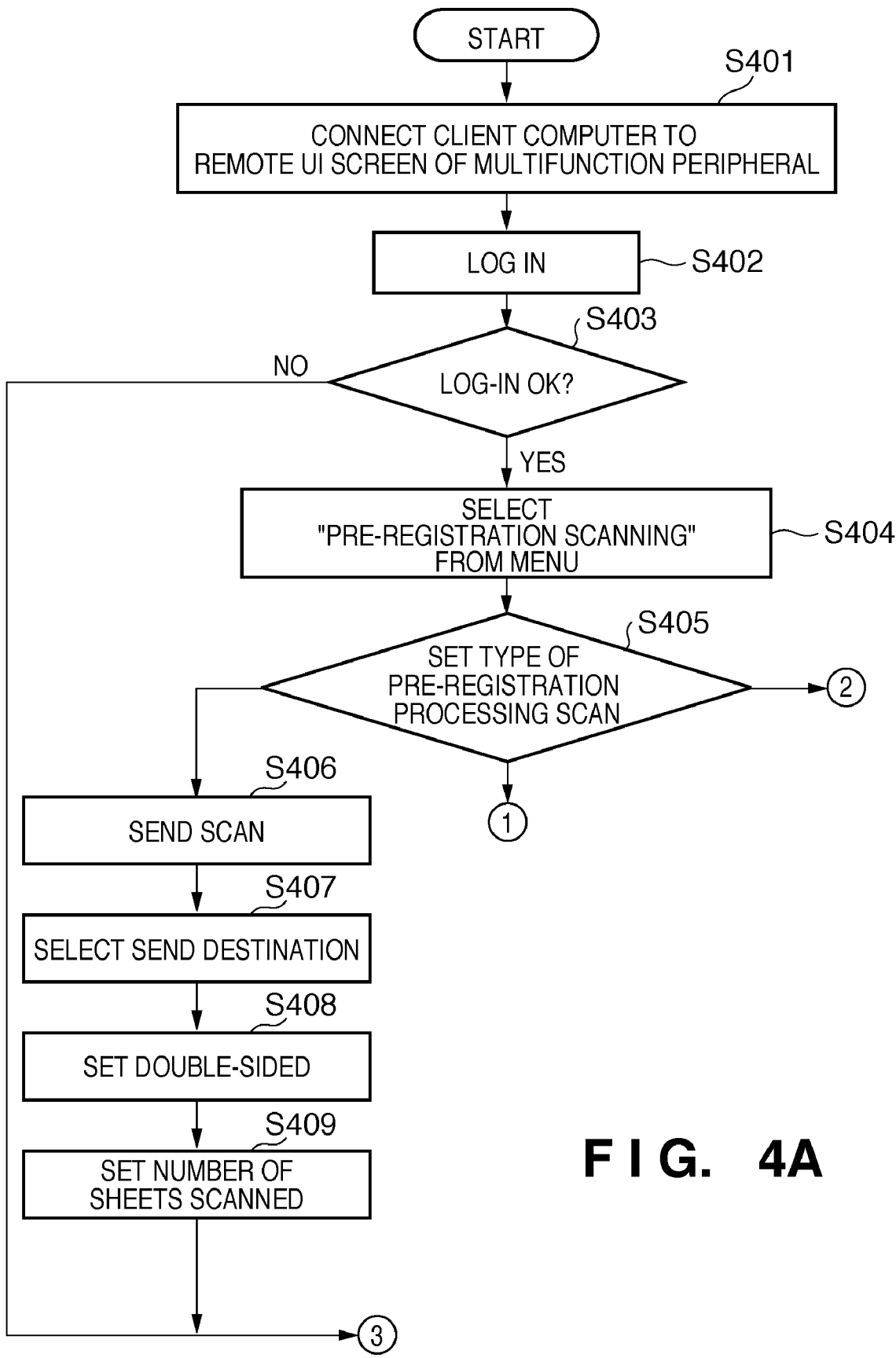
FIGS. 4A and 4B are flowcharts useful in describing processing for generating a scan job according to an embodiment of the present invention.
Figure 4B:
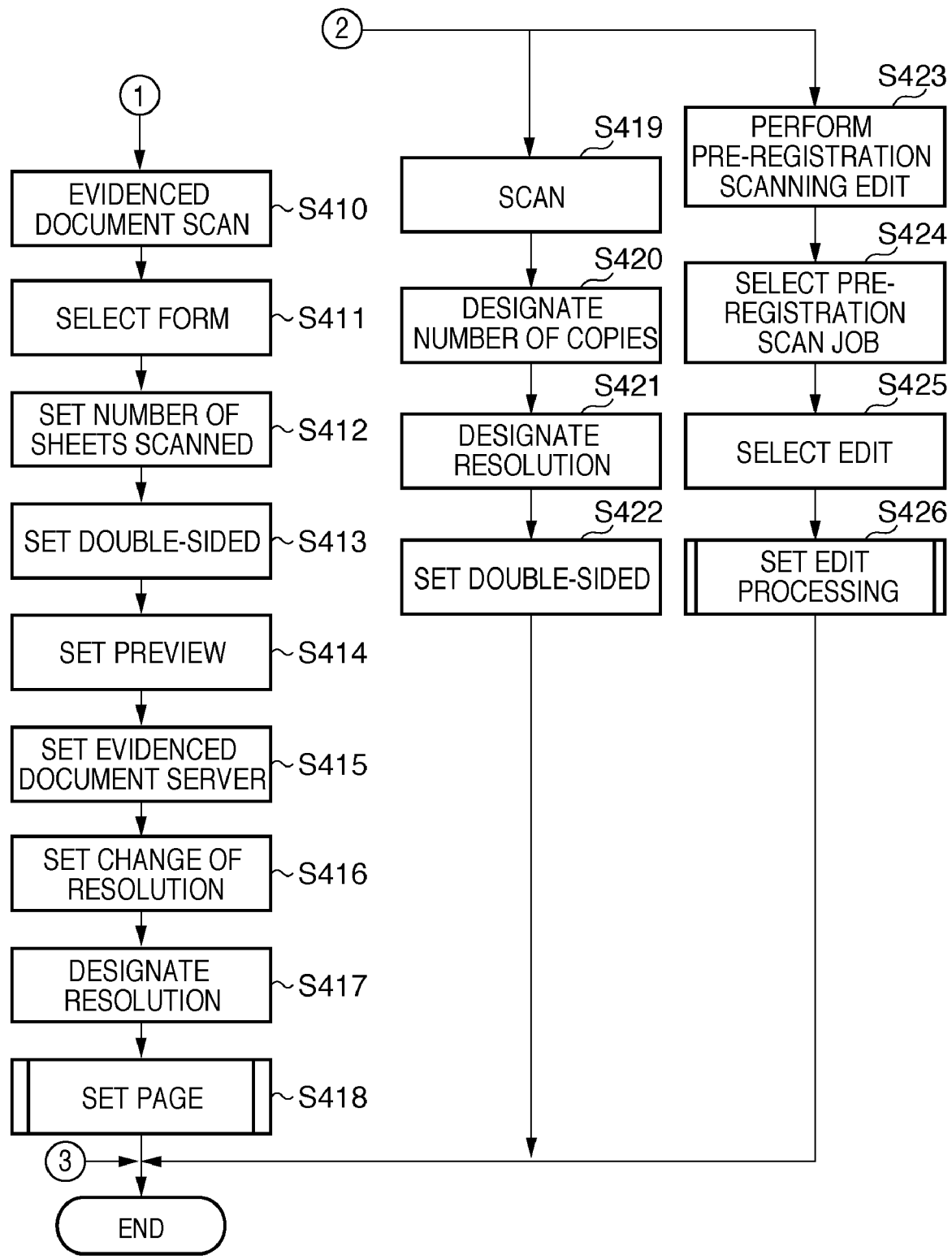

FIGS. 4A and 4B are flowcharts useful in describing processing for generating a scan job by a client computer according to this embodiment. These flowcharts are for describing, in greater detail, the processing for displaying the user interface of FIG. 3.

The client computer 101 is connected to the image forming apparatus 103 remotely at S401 in accordance with an operation performed by the user. As a result, the image forming apparatus 103 senses the connection to the computer 101 and displays a log-in screen on the client computer at step S402. If log-in processing succeeds ("YES" at step S403), control proceeds to step S404, where the "PRE-REGISTRATION SCANNING" menu 302 is displayed. At step S405, the user of the client computer is allowed to select the scan job to be registered.

If the fact that "SEND SCAN" has been selected by the user is sensed, control proceeds to step S406, where the image forming apparatus 103 displays a screen for send processing. Then, at step S407, the user of the client computer is allowed to set the mail address of the transmission destination. At steps S408 and S409, the user is allowed to make a double-sided setting (i.e., whether both sides of the original document are to be read) and to set the number of scanned sheets. It should be noted that the sequence of execution of steps S407 to S409 is not limited to that illustrated; any sequence of these steps is permissible.

If the user selects "EVIDENCED DOCUMENT SCAN" at step S405, then control proceeds to step S410, where the image forming apparatus 103 displays a screen for evidenced document scanning. Next, at step S411, the image forming apparatus 103 accepts selection of the type of evidenced document to be scanned. The image forming apparatus 103 then accepts setting of number of scanned sheets at step S412, double-sided setting at step S413, preview setting at step S414 and setting of the evidenced document server 102 at step S415. It should be noted that the preview setting is for setting whether or not to present a preview display of the data that has been overlaid. Next, the image forming apparatus 103 accepts the setting of resolution change enable/disable at step S416, designation of resolution at step S417 and page setting at step S418. The sequence of execution of steps S411 to S418 is not limited to that illustrated. The page setting at step S418 is for allowing acceptance of settings such as company name, account item, amount charged and remarks on a per-page basis, as described above with reference to FIG. 3.

If "SCAN" is selected at step S405, control proceeds to step S419. The image forming apparatus 103 accepts a setting of number of copies at step S420, a setting of resolution at step S421 and a double-sided setting at step S422. The sequence of execution of steps S420 to S422 is not limited to that illustrated.

If "SCAN JOB EDIT" of pre-registration scanning is selected at step S405, control proceeds to step S423, where a list of registered scan jobs is displayed, and then to step S424, where a scan job to be edited is selected from the list in accordance with a designation made by the user. At step S425, settings editing processing for this scan job is selected in accordance with user operation, whereupon editing is executed at step S426.

Figure 5A:
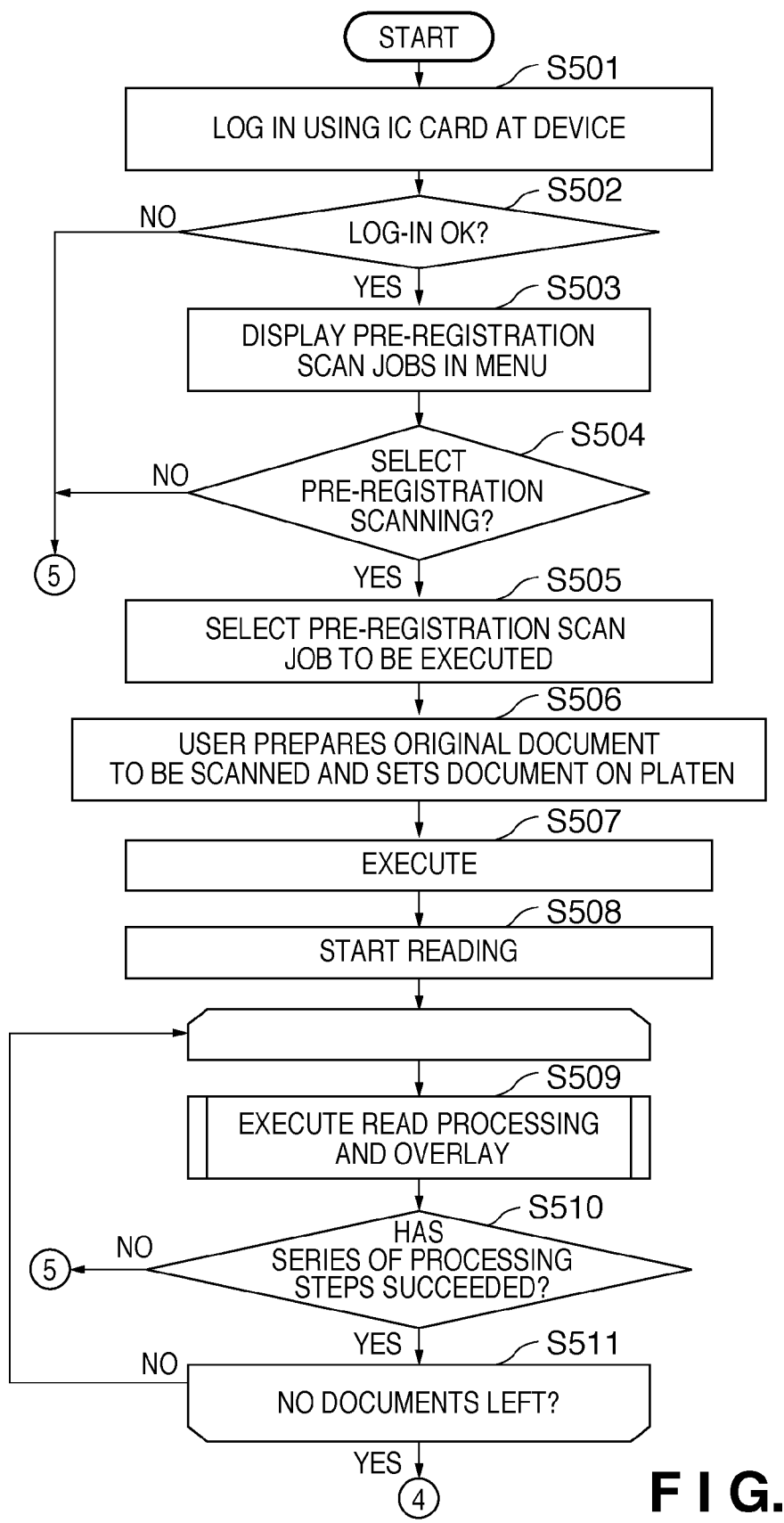
FIGS. 5A and 5B are flowcharts useful in describing scanning processing in an image forming apparatus according to an embodiment of the present invention.
Figure 5B:
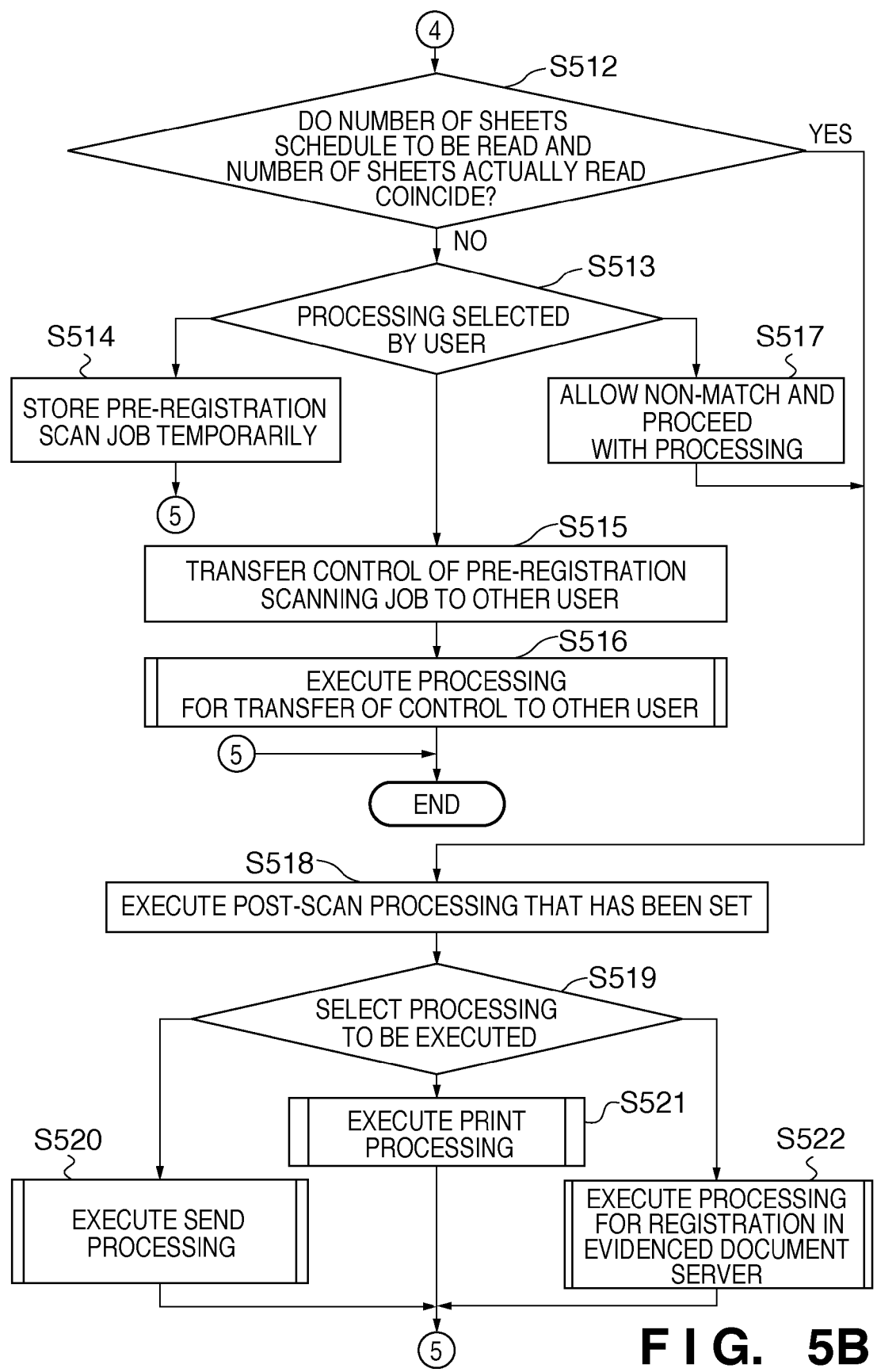

FIGS. 5A and 5B are flowcharts useful in describing scan processing in the image forming apparatus 103 according to this embodiment. A case will be described in which a user who has completed registration of an evidenced document scan job beforehand uses the image forming apparatus 103 to execute the registered scan job.

First, at step S501, the image forming apparatus 103 accepts log-in utilizing an IC card from the user or some other authentication means. If log-in succeeds ("YES" at step S502), then control proceeds to step S503, where the image forming apparatus 103 displays a menu of previously registered scan jobs on the control panel of the apparatus. In response, the user refers to the displayed menu of previously registered scan jobs and selects the scan job to be executed from the list of registered scan jobs at steps S504 and S505. Control then proceeds to step S506. Here the user prepares the original document of the selected scan job and places the document on the glass platen of the image forming apparatus 103, whereupon the image forming apparatus 103 senses the document. Then, at step S507, the user clicks the execute button. When this is sensed, the image forming apparatus 103 starts the reading operation (S508). At step S509, the image forming apparatus 103 reads this evidenced document and overlays the evidenced document data and the form. If an error of some kind occurs during processing ("NO" at step S510), then processing is exited. The reading of the evidenced document and the overlay processing thereof at step S509 are repeatedly executed until there is no longer an evidenced document read at step S511.

When there is no longer an evidenced document read at step S511, control proceeds to step S512. Here it is determined whether the read number of sheets (see FIG. 8) set in this evidenced document scan job coincides with the read number of sheets of the evidenced document. If the two numbers coincide, control proceeds to step S518, where post-scan processing that has been set is executed. That is, processing for which execution has been designated is determined at step S519 and then send processing, print processing and processing for registration in the evidenced document server 102 is executed at steps S520, S521 and S522, respectively.

If it is found at step S512 that the two numbers of sheets do not coincide, then control proceeds to step S513. Here the image forming apparatus 103 displays the following choices on the control panel and allows the user to select one: (A) "STORE SCAN JOB TEMPORARILY", (B) "REGISTER SCAN JOB TEMPORARILY AND TRANSFER CONTROL TO OTHER USER" and (C) "ALLOW NON-MATCH AND PROCEED WITH PROCESSING". It should be noted that the user may make the setting in the image forming apparatus 103 beforehand without selecting any of these choices. If item (A) is selected, control proceeds to step S514, where the pre-registration scan job is stored temporarily and processing is exited. If item (B) is selected, control proceeds to step S515, where this scan job is transferred to control of another user temporarily. Then, at step S516, this transfer processing is executed and then processing is exited. If item (C) is selected, control proceeds from step S517 to S518. Here processing is executed in the same manner as when the two numbers of sheets coincide.

Figure 6A:
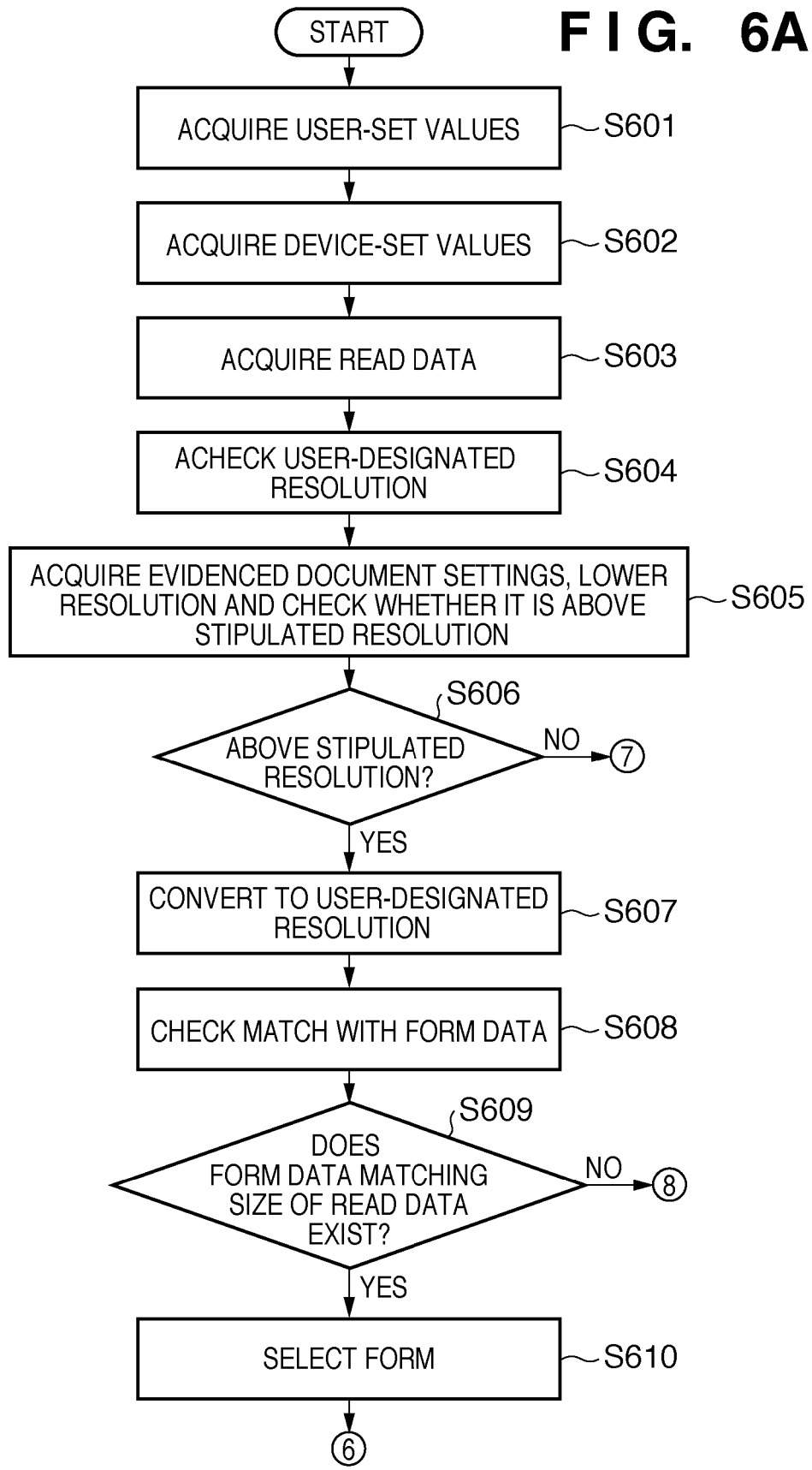
FIGS. 6A and 6B are flowcharts useful in describing processing for data conversion in an image forming apparatus according to an embodiment of the present invention.
Figure 6B:
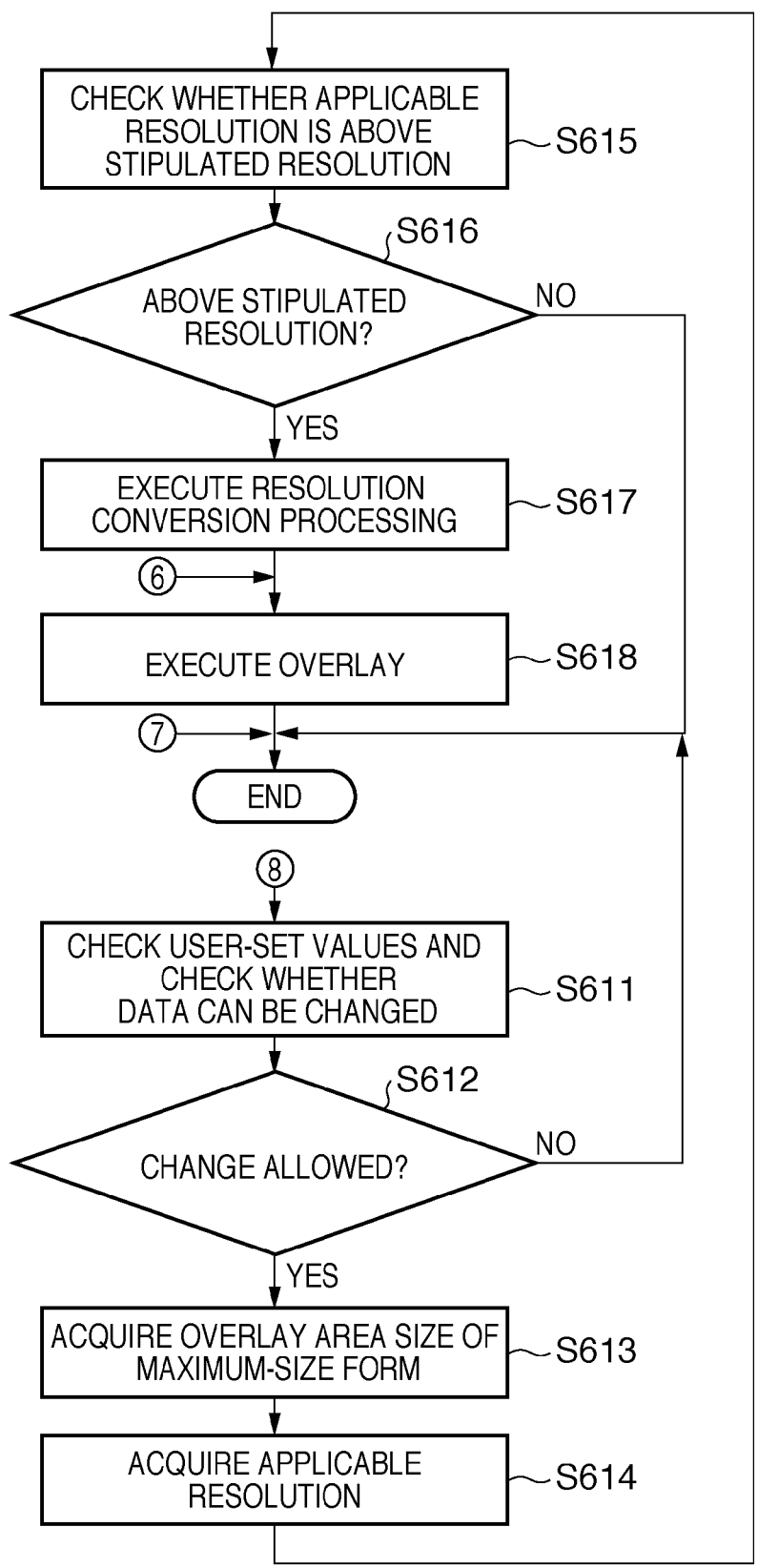

FIGS. 6A and 6B are flowcharts useful in describing processing for data conversion in the image forming apparatus 103 according to this embodiment.

First, content set by the user is extracted from the scan job at step S601. Next, the set content that has been set in the image forming apparatus 103 is acquired at step S602. In this case a value that has been set for every evidenced document is acquired at step S602. The evidenced document data is acquired at step S603. Next, resolution information designated by the user is acquired at step S604. Next, control proceeds to step S605, a value that has been set for every evidenced document scan is acquired and it is determined whether the resolution of the read data will be a resolution above a prescribed set value even if the resolution is lowered to the resolution designated by the user. In a case where the resolution will not be above the prescribed set value when the resolution is lowered, processing is terminated. At the time of evidenced document scanning, the default resolution is 600 dpi, by way of example. It will be ideal if the prescribed set value is made greater than 200 dpi. The reason is that if the resolution is lowered too much, there will be instances where the resolution is not suited to the standards for electronification of documents.

If the resolution designated by the user is determined to be above the prescribed set value ("YES" at step S606), then control proceeds to step S607 and a conversion is made to the resolution designated by the user. Then, at step S608, a check is made to determine whether there is a match with the form data. It is determined at step S609 whether form data that matches the read data size of the form data exists. If the data exists, then control proceeds to step S610, where this form data is selected. Control then proceeds to step S618, where overlay processing is executed.

On the other hand, if it is found at step S609 that the form data does not exist, then control proceeds to step S611. Here the resolution set by the user is checked and, in a manner similar to that described above, it is determined whether it is possible to change this resolution. When it is determined at step S612 that a change is not possible, processing exits as is. If a change is possible, however, control proceeds to step S613. Here an overlay area size of a form of maximum size in which the scanned image will fit is acquired. Then, at step S614, the applicable resolution of the scanned data is acquired. Control then proceeds to step S615. At steps S615 and S616, it is determined whether the applicable resolution satisfies the stipulated resolution and processing is exited if it does not. On the other hand, when the stipulated resolution is satisfied, control proceeds to step S617. Here processing for converting the resolution of the read data is executed and control proceeds to step S618, where overlay processing is executed.

Figure 7:
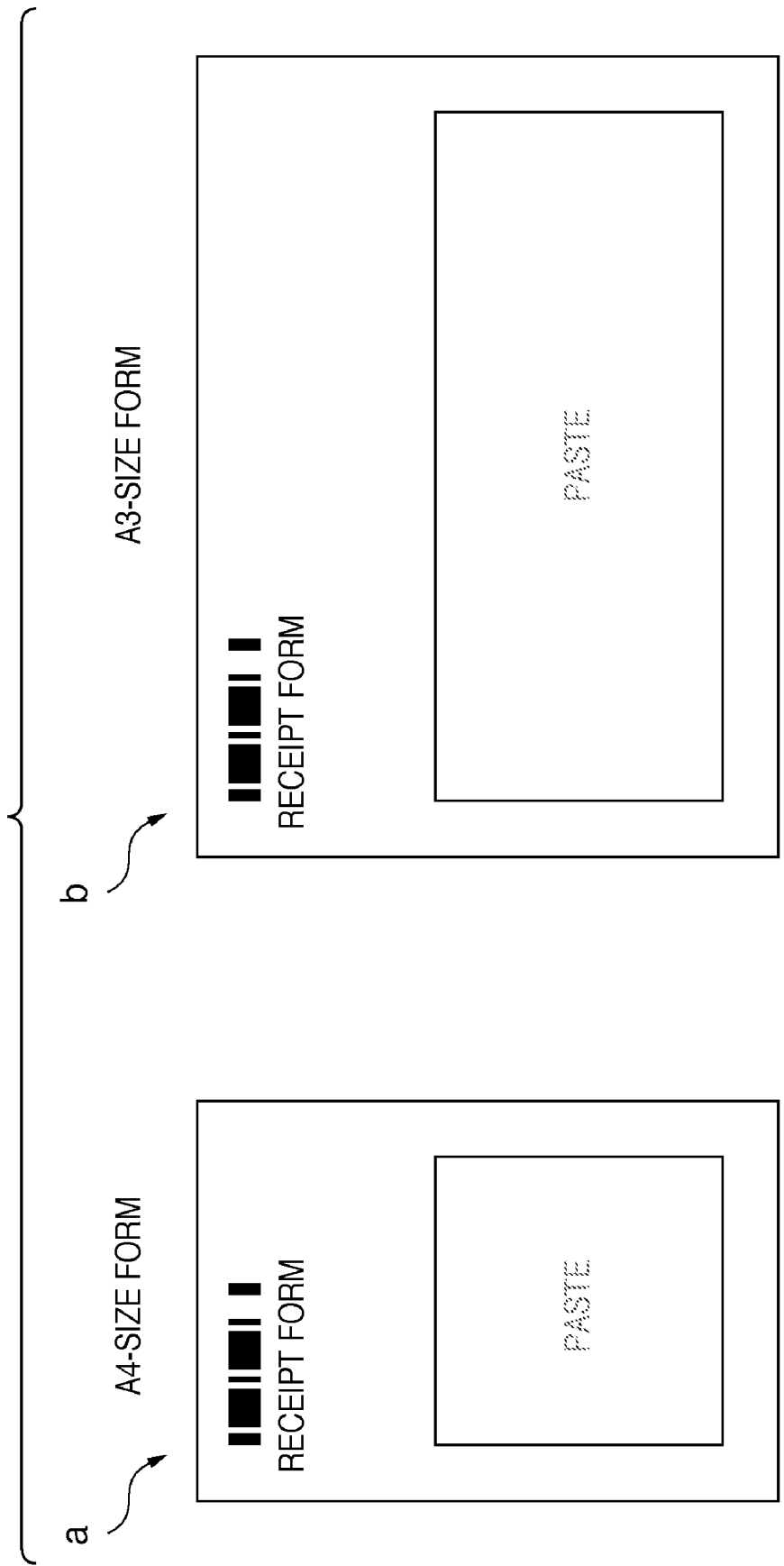
FIG. 7 is a diagram useful in describing an example of selection of a form in an image forming apparatus according to an embodiment of the present invention.

FIG. 7 is a diagram useful in describing an example of selection of a form in the image forming apparatus 103 according to this embodiment.

In FIG. 7, a illustrates a form of size A4 oriented in the vertical direction, and b illustrates a form of size A3 oriented in the horizontal direction.

As described above with reference to the flowcharts of FIGS. 6A and 6B, the size of form data that is the object of overlay may be excessive, depending upon the original document read, and t here is a possibility that the data will not fit. In order to prevent this, a method of changing the scanning resolution (e.g., lowering the resolution) to reduce the size of the evidenced document data is available. Another method is to change the size of the form in accordance with the size of the evidenced document data to thereby prevent the evidenced document from protruding from the form, and maintain the resolution of the evidenced document. In FIG. 7, forms of sizes A4 and A3 are illustrated. By selecting either form in accordance with the size of the evidenced document data, the evidenced document can be overlaid on the form without changing the resolution of the evidenced document data.

FIG. 8 is a diagram illustrating an example of a scan job table in which scan jobs are registered.

The scan job table is table data for registering scan jobs and is stored in the storage device of the image forming apparatus 103. The table includes "JOB ID" for uniquely identifying jobs, "USER ID" for identifying users who have registered jobs, "REGISTRATION TIME" indicating times at which jobs were registered, and "PRE-REGISTRATION TYPE" indicating types of scan jobs. Also included are "EVIDENCED DOCUMENT TYPE" representing types of evidenced documents, "NUMBER OF SCANNED SHEETS" for setting numbers of sheets scanned, "PREVIEW" for setting whether or not to present a preview display at the time of scanning, and "DOUBLE-SIDED SETTING" for setting whether or not to perform doubled-sided scanning. Further included are "CHANGE RESOLUTION" for setting whether or not a change is resolution is allowed, "RESOLUTION DESIGNATION" for setting specific values of resolution, and "STORAGE SERVER" for designating storage destination of scanned data. It should be noted that "PREVIEW", "DOUBLE-SIDED SETTING" and "CHANGE RESOLUTION" have been set to either "YES", indicating that the item is allows, or to "NO", indicating that the item is not allowed. Further, "RESOLUTION DESIGNATION" is set to "DEFAULT" a previously designated resolution is set.

FIG. 9 is a diagram illustrating an example of an individual-job table according to this embodiment.

The individual-job table is a table that holds more detailed information for every job ID described in FIG. 8. This table also is stored in the storage device of the image forming apparatus 103. Data such as "COMPANY NAME", "ACCOUNT NAME", "ITEM NAME", "AMOUNT", "TRANSACTION NAME" and "REMARKS" to be retained on a per-page basis is stored in this table.

FIG. 10 is a diagram illustrating an example of a parameter settings table set on a per-menu-item basis according to this embodiment. The menu items here are "EVIDENCED DOCUMENT SCAN", "SCAN" and "SEND SCAN", which are the types of scan jobs illustrated in FIG. 9.

FIG. 10 illustrates the state of this table in a case where parameters have been set in relation to evidenced document scan. Two parameters have been set in the table in this state. One (Parameter 1) relates to "RESOLUTION" and the other (Parameter 2) relates to "FORM". Respective default values (Default), maximum values (Max) and minimum values (Min) have been set. In a case where it is desired to increase the number of items, this can be achieved by adding on parameters.

FIG. 14 is a diagram illustrating an example of a display presented on the display unit of the control panel of the image forming apparatus 103 according to this embodiment.

When log-in to the image forming apparatus 103 by the user is confirmed, the image forming apparatus 103 displays the screen shown in FIG. 14 on the control panel of the image forming apparatus 103. If there are unprocessed scan jobs and print jobs at the time of log-in by the user, the image forming apparatus 103 displays these in the main area of the control panel. If the user selects the job and clicks the execute key, then the image forming apparatus 103 executes the necessary processing.

(Other Embodiments)

It should be noted that the present invention can also be attained by supplying a software program, which implements the functions of the foregoing embodiment, directly or remotely to a system or apparatus, reading the supplied program with a computer of the system or apparatus, and then executing the program. In this case, so long as the system or apparatus has the functions of the program, the mode of implementation need not be a program.

Accordingly, since the functional processing of the present invention is implemented by computer, the program codes per se installed in the computer also implement the present invention. In other words, the claims of present invention also cover a computer program per se that is for the purpose of implementing the functional processing of the present invention. In this case, so long as the system or apparatus has the functions of the program, the form of the program, e.g., object code, a program executed by an interpreter or script data supplied to an operating system, etc., does not matter.

Examples of recording media for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, the program can also be supplied by connecting to a website on the Internet using the browser of a client computer and downloading the program from the website to a recording may be the computer program of the present invention itself or a compressed file containing an automatic installation function. Further, implementation is possible by dividing the program codes constituting the program of the present invention into a plurality of files and downloading the files from different websites. In other words, a WWW server that downloads, to multiple users, the program files that implement the functional processing of the present invention by computer also is covered by the claims of the present invention.

Further, it is also permissible to adopt a form in which the program of the present invention is encrypted and stored on a storage medium such as a CD-ROM and the storage medium is distributed to users. In this case, users who meet certain requirements are allowed to download decryption key information from a website via the Internet, and the program decrypted using this key information is installed in a computer in executable form.

Further, implementation is possible also in a form other than one in which the functions of the foregoing embodiment are implemented by having a computer execute a program that has been read. For example, based upon indications in the program, an operating system or the like running on the computer may perform all or a part of the actual processing so that the functions of the foregoing embodiment can be implemented by this processing.

Furthermore, it may be so arranged that a program that has been read from a recording medium is written to a memory provided on a function expansion board inserted into the computer or provided in a function expansion unit connected to the computer. In this case, a CPU or the like provided on the function expansion board or function expansion unit subsequently performs some or all of the actual processing based upon the indications in the program, and the functions of the foregoing embodiment are implemented by this processing.

In accordance with the present invention, data that has been scanned in accordance with a registered scan job and a form can be overlaid and output upon judging the consistency between the data and the form.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-324014, filed Dec. 14, 2007, and 2008-313709, filed Dec. 9, 2008, which is hereby incorporated by reference herein in their entirety.

What is claimed is:

1. An image processing apparatus comprising:
a receiving unit that receives a scan job of a document;
an accepting unit that accepts a designation to execute the scan job received by said receiving unit, including a user-designated resolution;
a scanning unit that scans the document;
a first determining unit that determines whether the number of sheets set in the scan job accepted by said accepting unit coincides with the number of sheets of the document scanned by said scanning unit;
a second determining unit that determines whether the user-designated resolution is higher than a prescribed resolution;
an executing unit that:
    converts the data of the scanned document to the user-designated resolution and sends the resolution-converted data of the scanned document if the first determining unit determines that the number of sheets set in the scan job accepted by said accepting unit coincides with the number of sheets of the document scanned by said scanning unit and the second determining unit determines that the user-designated resolution is higher than the prescribed resolution; and
    sends the data of the scanned document without performing resolution conversion to the user-designated resolution if the first determining unit determines that the number of sheets set in the scan job accepted by said accepting unit coincides with the number of sheets of the document scanned by said scanning unit and the second determining unit determines that the user-designated resolution is lower than the prescribed resolution.

2. The apparatus according to claim 1, further comprising:
a selecting unit which, in a case where the accepted scan job includes an overlay designation to overlay the document data and form data, selects a form for overlaying with the document data;
an overlay unit that overlays the data of the form selected by said selecting unit and the document data; and
a registration unit that registers generated overlay data in a server as a result of overlay processing by said overlay unit.

3. The apparatus according to claim 1, wherein the scan job comprises at least the number of sheets scanned, resolution information, resolution change enable/disable, and information relating to a server that is a destination of storage.

4. The apparatus according to claim 1, further comprising:
a selecting unit which, in a case where the accepted scan job includes an overlay designation to overlay the document data and form data, selects a form for overlaying with the document data; and
an overlay unit that overlays the data of the form selected by said selecting unit and the document data,
wherein said overlay unit changes the resolution of the scanned-in data and overlays the data in a case where the size of the form selected by said selecting unit and the size of the scanned-in data do not match.

5. The apparatus according to claim 1, further comprising:
a selecting unit which, in a case where the accepted scan job includes an overlay designation to overlay the document data and form data, selects a form for overlaying with the document data; and
an overlay unit that overlays the data of the form selected by said selecting unit and the document data,
wherein data of the form has been registered in a scanner or server.

6. A method of controlling an image processing apparatus, said method comprising:
- a receiving step of receiving a scan job of a document;
- an accepting step of accepting a designation to execute the scan job received in the receiving step, including a user-designated resolution;
- a scanning step of scanning the document;
- a first determining step of determining whether the number of sheets set in the scan job accepted in the accepting step coincides with the number of sheets of the document scanned in the scanning step;
- a second determining step of determining whether the user-designated resolution is higher than a prescribed resolution;
- first execution step of converting the data of the scanned document to the user-designated resolution and sending the resolution-converted data of the scanned document if the first determining step determines that the number of sheets set in the scan job accepted by in the accepting unit step coincides with the number of sheets of the document scanned in the scanning step and the second determining step determines that the user-designated resolution is higher than the prescribed resolution; and
- a second executing step of sending the data of the scanned document without performing resolution conversion to the user-designated resolution if the first determining step determines that the number of sheets set in the scan job accepted in the accepting step coincides with the number of sheets of the document scanned in the scanning step and the second determining step determines that the user designated resolution is lower than the prescribed resolution.

7. The method according to claim 6, further comprising:
- a selecting step of selecting, in a case where the accepted scan job includes an overlay designation to overlay the document data and form data, a form for overlaying with the document data;
- an overlay step of overlaying the data of the form selected in said selecting step and the document data; and
- a registering step of registering generated overlay data in a server as a result of overlay processing in said overlay step.

8. The method according to claim 6, wherein the scan job comprises at least the number of sheets scanned, resolution information, resolution change enable/disable, and information relating to a server that is a destination of storage.

9. The method according to claim 6, further comprising:
- a selecting step of selecting, in a case where the accepted scan job includes an overlay designation to overlay the document data and form data, a form for overlaying with the document data; and
- an overlay step of overlaying the data of the form selected in said selecting step and the document data,
- wherein said overlay step changes the resolution of the scanned-in data and overlays the data, in a case where the size of the form selected in said selecting step and the size of the scanned-in data do not match.

10. The method according to claim 6, further comprising:
- a selecting step of selecting, in a case where the accepted scan job includes an overlay designation to overlay the document data and form data, a form for overlaying with the document data; and
- an overlay step of overlaying the data of the form selected in said selecting step and the document data,
- wherein data of the form has been registered in a scanner or server.

11. A non-transitory computer-readable storage medium storing a computer program executable by a computer to execute a method of controlling an image processing apparatus, the method comprising:
- a receiving step of receiving a scan job of a document;
- an accepting step of accepting a designation to execute the scan job received in the receiving step, including a user-designated resolution;
- a scanning step of scanning the document;
- a first determining step of determining whether the number of sheets set in the scan job accepted in the accepting step coincides with the number of sheets of the document scanned in the scanning step;
- a second determining step of determining whether the user-designated resolution is higher than a prescribed resolution;
- a first execution step of converting the data of the scanned document to the user-designated resolution and sending the resolution-converted data of the scanned document if the first determining step determines that the number of sheets set in the scan job accepted by in the accepting step coincides with the number of sheets of the document scanned in the scanning step and the second determining step determines that the user-designated resolution is higher than the prescribed resolution; and
- a second executing step of sending the data of the scanned document without performing resolution conversion to the user-designated resolution if the first determining step determines that the number of sheets set in the scan job accepted in the accepting step coincides with the number of sheets of the document scanned in the scanning step and the second determining step determines that the user designated resolution is lower than the prescribed resolution.

* * * * *